United States Patent Office 3,836,625
Patented Sept. 17, 1974

3,836,625
REPROCESSING OF SPENT NUCLEAR FUEL
Lothar Schäfer, Steinbach, Taunus, and Bernhard Wojtech, Bad Soden, Taunus, Germany, assignors to Farbwerke Hoechst Aktiengesellschaft vormals Meister Lucius & Bruning, Frankfurt am Main, Germany
No Drawing. Filed Nov. 22, 1971, Ser. No. 201,216
Claims priority, application Germany, Nov. 24, 1970,
P 20 57 760.0
Int. Cl. B01d 11/00
U.S. Cl. 423—10
3 Claims

ABSTRACT OF THE DISCLOSURE

Reprocessing of nuclear fuel is improved by recovering uranium and thorium during an additional anticyclic liquid-liquid extraction process which is applied to the organic phase of the first extraction cycle. The improvement of the process is based on the addition of ethylenediaminetetra-acetic acid (EDTA) to the aqueous reextracting solution.

---

The present invention relates to an improvement in the separation of fission products (decontamination) in the regeneration of spent nuclear fuels.

Among the spent nuclear fuels two types exist which differ substantially by one of their main components, namely those which contain uranium and plutonium and those which contain uranium and thorium. The components are generally regenerated from an aqueous solution containing nitrate ions by extraction with tributyl phosphate. In the case of plutonium-containing fuels the Purex process is used (cf. Reactor Handbook, second edition, volume II, Fuel Reprocessing, New York (1961), pages 146 et seq.), and for fuels containing thorium the Thorex process (loc. cit. pages 214 et seq.) has been developed. In either case the fuel is dissolved in nitric acid. In the Purex process an acidic feed solution is used for the extraction while in the Thorex process a special pretreatment has been proposed for the feed solution (cf. German Pat. No. 1,170,918, corresponding to U.S. Pat. 3,049,400. R. H. Rainey and J. G. Moore, "Laboratory Development of the Acid Thorex Process for Recovery of Thorium Reactor Fuel," Nuclear Science and Engineering, volume 10, (1961), pages 367–371).

In this pretreatment, excess nitric acid is distilled off from the fuel solution and then part of the nitric acid formed from the nitrates by hydrolysis is removed at elevated temperature, optionally with the aid of stream distillation, whereby basic nitrates are formed. This lowering of the nitrate ion concentration in the fuel solution results in improved separation of fission products as compared with a solution in which the nitrate ion concentration has not been lowered, because when basic nitrates are formed fission products that are easier to hydrolyze, for example zirconium, are hydrolyzed and thus transformed into a form which is difficult to extract.

In the Thorex process thorium and uranium are separated in a counter current extractor comprising an extraction section and a scrubbing section. The nitrate-containing feed solution is supplied at one end of the extraction section, while at the other end a solution of 30% by volume of an organic compound, for example tributyl phosphate in kerosene, is introduced in countercurrent. In order to maintain sufficient extraction, nitrate ions must be added to the system as a salting agent. Thorium and uranium then pass into the organic phase. Most of the fission products are not extracted. They remain in the aqueous phase which goes into the waste. In the scrubbing section those fission products which have passed into the organic phase with the thorium and uranium are removed by scrubbing with dilute nitrate-containing solutions. However, they can be washed out only to a certain extent. To separate other unwanted substances from the scrubbing solution other substances are added, for example iron-II-sulphamate for the reduction of chromate dissolved out of the stainless steel of the vessel, and phosphoric acid to separate out protactinium. Then the organic extract containing thorium and uranium is treated in an extractor to separate the thorium from the uranium and to recover the thorium in the form of an aqueous solution. The uranium is recovered as an aqueous solution in a third extractor.

Hitherto, this method has generally only been used to treat fuels having a low content of fission products. When it is used for reprocessing nuclear fuels containing a high proportion of fission products, for example those obtained during the operation of a nuclear reactor, the adjustment of nitrate ion deficiency in the feed solution involves the separation of precipitates that are difficult to filter, mainly a precipitate of hydrated zirconium oxide, due to the higher concentration of fission products. It is, therefore, necessary to perform a further separating operation and to wash the separated precipitate. In industrial reprocessing, precipitates that are difficult to filter are not desirable. Besides technical difficulties with remote control equipment, additional expenditures pertaining to apparatus and time are required. Moreover, some uranium and thorium is lost by adsorption and incorporation in the precipitate.

The formation of a precipitate can be avoided by adjusting the composition of the fuel solution to that suitable for the extraction of thorium and uranium by distilling off the nitric acid only to such an extent that a hydrolytic transformation cannot take place. Feed solutions of this type have an acid content above 0.5 mole/liter of nitric acid. Acid feed solutions have, however, the drawback that larger amounts of zirconium and other fission products are extracted with the uranium and thorium. Owing to the limited efficiency of scrubbing with dilute nitrate-containing solutions, thorium and uranium are thus contaminated to a much larger degree, which results in higher radioactivity in the extracted products.

It is, therefore, the object of the present invention to increase the efficiency of the scrubbing process and to combine the advantage of avoiding the formation of a precipitate by using an acid feed solution, with improved removal of the fission products.

The present invention provides a process for separating out fission products in the aqueous regeneration of uranium and thorium from spent nuclear fuels which may also contain plutonium, wherein a nitrate-containing feed solution of the fuels is prepared, the thorium and uranium salts are extracted by means of organic extractants, for example tributyl phosphate diluted with kerosene, from the nitrate-containing aqueous solution and the fission products are then removed from the organic phase by scrubbing in a multistage liquid-liquid counter-current extraction system, consisting of an extraction section and a scrubbing section, and wherein an aqueous solution of ethylenediamine tetracetic acid or the salts is added thereof, preferably the sodium salts, to remove the fission products. In this manner the poor extractability of the fission products from the aqueous phase is further reduced by the formation of water-soluble complexes. The small amount of fission products which is driven into the organic phase is washed out again in the scrubbing section by complex formation in the aqueous phase.

Ethylenediamine tetraacetic acid (EDTA) or the salts thereof are preferably added to the scrubbing liquid. Portions thereof may be added simultaneously with the feed solution, although they develop their effect only in the extraction section. When an acid feed solution is used, the scrubbing solution is preferably a solution of sodium ethylenediamine tetraacetate in water. With feed solutions without excess nitric acid the scrubbing solution should contain nitrate ions besides EDTA. The amount of EDTA used should be governed by the amount of fission products in the solution because too high an addition unnecessarily increases the volume of waste.

The concentration of EDTA or its salts in the scrubbing solution should preferably be in the range of from 0.001 to 0.3 mole per liter, more preferably 0.01 to 0.1 mole per liter.

The scrubbing solution containing the EDTA and leaving the final stage of the scrubbing section is advantageously recirculated into one of the two final stages of the extraction section, while a solution of tributyl phosphate is introduced into the other final stage.

It is advantageous to use a feed solution containing an excess of nitric acid in a concentration in the range of from 0.5 to 3.0 moles of $HNO_3$ per liter, preferably from 0.7 to 1.1 moles per liter.

Tributyl phosphate solutions of various concentrations in various liquid hydrocarbons can be used in the process of the invention. Concentrations of tributyl phosphate of from 1 to 45% by volume may be used, concentrations of from 5 to 30% by volume being preferred. Suitable solvents are paraffin hydrocarbons having from 10 to 16 carbon atoms, preferably normal paraffins, for example, $n$-dodecane. Good results are also obtained with mixtures of corresponding hydrocarbons, for example kerosene.

The invention is not limited, however, to the use of tributyl phosphate in hydrocarbons. Other suitable extractants from uranium, thorium and plutonium may also be used, for example di-sec.butylphenyl phosphonate in diethylbenzene or ketones, such as methylisobutylketone, or ethers, for example dibutoxy-diethyl ether.

The process of the invention improves the separation of fission products, especially of zirconium. By operating with an acid feed solution the formation of a precipitate is avoided and by using ethylene-diamine tetraacetic acid or one of its salts efficient removal of the fission products is achieved.

It has been found that the decontamination factor (activity per unit of product prior to extraction in relation to the activity after extraction) is increased by the process of the invention. Thus, in the case of thorium the decontamination factor of the total gamma radiation is increased up to 16 times and the decontamination factor of the total beta radiation is increased by up to 44 times. The decontamination factors of uranium with respect to the total gamma radiation are increased up to 15 times and with respect to the total beta radiation up to 260 times. Especially striking was the 17,000 fold increase of the decontamination factor of zirconium in the separated thorium. Zirconium is one of the most frequently occurring fission products having a high degree of activity. With higher burn-up its content in the fuel may be above 1%. As it can be extracted by a 30% volume solution of tributyl phosphate in kerosene, it is among the more troublesome fission products in the Thorex and Purex processes.

To judge the effectiveness of an extraction process, the decontamination factor for zirconium is, therefore, also considered.

Addition of ethylenediamine tetraacetic acid does not impair the extraction properties of thorium and uranium and does not affect their yields. At the end of the process, the ethylenediamine tetraacetic acid passes quantitatively into the aqueous waste together with the fission products.

The advantageous effect of the addition of ethylenediamine tetraacetic acid on the separation of the fission products, especially of zirconium, simplifies and accelerates the reprocessing. In general, to achieve improved separation of fission products, a further extraction cycle has to be performed. In the process of the invention, however, a purer product can be obtained in one operation stage without additional treatment.

The following Examples illustrate the invention.

EXAMPLE I

A highly burned fuel of the AVR reactor at Jülich with a burn-up of about 60,000 MW d./t. was used after 140 days of cooling. The fuel was processed in hot cells in three mixing-settling sections A, B and C of the CEN type (cf. R. de Witte et al. CEN–R–718 (1959)). A was for the extraction and scrubbing of the extract; B was for the separation of thorium, and C was for uranium re-extraction. Each mixing settling section was composed of 16 stages. The AVR fuel, comprising thorium carbide and uranium carbide, was burned to the corresponding oxides and dissolved in a titanium apparatus provided with reflux condenser in boiling Thorex reagent [13 molar $HNO_3$; 0.05 molar $F^-$; 0.1 molar $Al^{(3+)}$. Protactinium was then separated on Vycor glass]. Next, nitric acid was distilled off until the boiling point of the solution had risen to 135° C. The solution was diluted to a thorium concentration of 1.15 moles per liter, so that the formation of a precipitate was avoided. The acid value obtained with this adjustment was 0.75 mole per liter of $HNO_3$, and the uranium content was 0.15 mole per liter. The flow scheme indicated below proved to be especially suitable under the extraction conditions described above.

FLOW SCHEME

| Section and stage | | Stream | Relative flow rate | Composition |
|---|---|---|---|---|
| A | 1 | Scrub solution. | 1.0 | $H_2O$, 0.05 disodium ethylene diamine tetraacetate. |
| A | 9 | Feed solution. | 1.0 | 1.15 M $Th(NO_3)_4$ up to 0.2 M $UO_2(NO_3)_2 \approx 0.8$ M $HNO_3$, $Al^{3+}$, $F^-$, fission products. |
| A | 13 | Salting agent. | 0.22 | 13 M $HNO_3$. |
| A | 16 | Extractant | 9.5 | 30 vol.-percent TBP in $n$—dodecane. |
| B | 1 | Re-extractant. | 4.5 | 0.01 M $HNO_3$. |
| B | 9 | Extract of battery A. | ~9.5 | Uranium and thorium in TBP—dodecane. |
| B | 16 | Scrub solution. | 1.8 | 30 vol.percent TBP in $n$-dodecane. |
| C | 1 | Re-extractant. | 6.0 | 0.01 M $HNO_3$. |
| C | 16 | Extract of battery B. | ~11.3 | Uranium in TBP-dodecane. |

The feed solution specified above was introduced into stage 9 of section A at a rate of flow of 1.0 ml. per minute. The extraction solution consisting of 30% by volume of tributyl phosphate in $n$-dodecane fed into stage 16 of section A flowed in counter-current therewith at a rate of 9.5 ml. per minute. The salting agent, i.e. 13 molar $HNO_3$ was supplied in stage 13 of section A at a rate of 0.22 ml. per minute. In a direction opposite to the organic extract in the scrubbing section, a scrub solution, supplied in stage 1 of section A and consisting of a 0.05 molar solution of sodium ethylene-diamine tetraacetate in water, flowed at a rate of 1.0 ml. per minute.

The organic extract leaving stage 1 of section A was fed into stage 9 of section B. The re-extraction agent consisting of 0.01 molar $HNO_3$ and introduced into stage 1 of section B at a rate of 4.5 millilitres per minute extracted the thorium from the organic extract containing thorium and uranium. Small proportions of uranium in the thorium-containing aqueous solution were removed with a scrub solution consisting of 30% by volume of tributyl phosphate in $n$-dodecane which was supplied in stage 16 of section B at a rate of 1.8 ml. per minute. The organic extract issuing from stage 1 of section B, which only contained uranium, was introduced into stage 16 of section C. To re-extract the uranium, stage 1 of section C was charged with 0.01 molar $HNO_3$ at a rate of 6.0 ml. per minute. The refined thorium left stage 16 of section B while the refined uranium left stage 16 of section C. The yield of thorium amounted to 99.6% of the thorium initially used, the yield of uranium was found to be 99.9%.

The following decontamination factors were found:

Total $\gamma$: Th=$1.1 \times 10^3$; U=$1.8 \times 10^4$
Total $\beta$: Th=$2.6 \times 10^4$; U=$9.6 \times 10^4$
Cerium: Th=$2.1 \times 10^7$; U=$3.6 \times 10^8$
Ruthenium: Th=52; U=93
Zirconium: Th=$1.9 \times 10^6$; U=$2.9 \times 10^5$ The effect of EDTA in the process of the invention is evident when the decontamination factors are compared with decontamination factors obtained in the reprocessing of a corresponding fuel according to the same flow scheme using dilute nitric acid instead of EDTA, whereby the following results are obtained:

Total $\gamma$: Th=66; U=$1.2 \times 10^3$
Total $\beta$: Th=590; U=$1.7 \times 10^3$
Cerium: Th=$2.6 \times 10^4$; U=$3.9 \times 10^7$
Ruthenium: Th=18; U=74
Zirconium: Th=110; U=$9 \times 10^4$

EXAMPLE 2

Highly burned fuel of the AVR reactor at Jülich with a burn-up of about 60,000 MW d./t. was used after a cooling time of 161 days. The experiment was carried out under the conditions specified in Example 1 with the following exceptions:

The feed solution had an acid content of 0.71 mole per liter of $HNO_3$ and a uranium content of 0.2 mole per liter. The extraction was performed in accordance with the flow scheme indicated in Example 1. Thorium was recovered in a yield of 99.7% and the yield of uranium was above 99.9%.

The following decontamination factors were obtained:

Total $\gamma$: Th=$1.8 \times 10^2$; U=$5.4 \times 10^3$
Total $\beta$: Th=$1.8 \times 10^4$; U=$4.4 \times 10^5$
Cerium: Th=$1 \times 10^7$; U=$1.7 \times 10^8$
Ruthenium: Th=98; U=226
Zirconium: Th=$3.1 \times 10^5$; U=$2.6 \times 10^5$

What we claim is:

1. In a process for separating fission products from uranium and thorium during the reprocessing of spent nuclear fuels containing uranium, thorium, and such fission products, which process comprises (1) extracting uranium nitrate and thorium nitrate from an aqueous solution containing uranium, thorium, and said fission products in the form of their nitrates with a tributylphosphate in a liquid hydrocarbon and (2) scrubbing the organic phase to remove fission products therefrom, said steps being performed in a multi-stage liquid-liquid countercurrent extraction system comprising an extraction section and a scrubbing section, the improvement wherein the scrubbing liquid in said scrubbing section consists essentially of an aqueous solution of ethylenediamine tetraacetic acid or a salt thereof present in said scrubbing solution in a concentration of from 0.001 to 0.3 mol per liter, whereby an increased removal of fission products from the organic phase is effected, without substantial removal of uranium and thorium therefrom.

2. A process as in Claim 1 wherein the scrubbing solution containing ethylenediamine tetraacetic acid and leaving the final stage of the scrubbing section of said system is passed, together with feed solution, into one of the two final stages of the extraction section of said system, and tributylphosphate solution is fed into the other final stage.

3. A process as in Claim 1 wherein the concentration of ethylenediamine tetraacetic acid in the scrubbing solution is from 0.01 to 0.1 mol per liter.

References Cited

UNITED STATES PATENTS

| | | | |
|---|---|---|---|
| 3,049,400 | 8/1962 | Rainey, et al. | 423—10 |
| 3,192,012 | 6/1965 | Rice | 260—429.1 |
| 3,523,765 | 8/1970 | Grieneisen | 423—10 |
| 3,049,402 | 8/1962 | Hildebrandt, et al. | 260—429.1 |
| 2,798,789 | 7/1957 | Spedding, et al. | 260—429.2 |
| 3,230,036 | 1/1966 | Kappelmann, et al. | 423—10 |

OTHER REFERENCES

Korkisch, J.: *Modern Methods for the Separation of Rarer Metal Ions*, New York, Pergamon Press, 1969, pp. 144–46.

BENJAMIN R. PADGETT, Primary Examiner

R. L. TATE, Assistant Examiner

U.S. Cl. X.R.

252—301.1 R; 260—429.1, 429.2